(12) United States Patent
Akella et al.

(10) Patent No.: US 9,438,504 B2
(45) Date of Patent: Sep. 6, 2016

(54) NETWORK ROUTING SYSTEM PROVIDING INCREASED NETWORK BANDWIDTH

(75) Inventors: Srinivasa Aditya Akella, Middleton, WI (US); Ashok Anand, Madison, WI (US); Srinivasan Seshan, Pittsburgh, PA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 957 days.

(21) Appl. No.: 12/480,353

(22) Filed: Jun. 8, 2009

(65) Prior Publication Data

US 2010/0254378 A1    Oct. 7, 2010

Related U.S. Application Data

(63) Continuation-in-part of application No. 12/418,396, filed on Apr. 3, 2009.

(51) Int. Cl.
| | | |
|---|---|---|
| H04L 12/26 | (2006.01) | |
| H04L 12/701 | (2013.01) | |
| H04L 12/725 | (2013.01) | |
| H04L 12/717 | (2013.01) | |
| H04L 12/851 | (2013.01) | |
| H04L 29/06 | (2006.01) | |

(52) U.S. Cl.
CPC .............. *H04L 45/00* (2013.01); *H04L 45/30* (2013.01); *H04L 45/42* (2013.01); *H04L 47/24* (2013.01); *H04L 69/04* (2013.01); *H04L 69/14* (2013.01)

(58) Field of Classification Search
None
See application file for complete search history.

(56) References Cited

U.S. PATENT DOCUMENTS

| | | | | |
|---|---|---|---|---|
| 5,610,904 | A * | 3/1997 | Eng et al. ...................... 370/408 |
| 6,046,985 | A * | 4/2000 | Aldred et al. ................. 370/252 |
| 7,035,240 | B1 * | 4/2006 | Balakrishnan ........ H04W 84/18 370/328 |
| 8,339,965 | B2 * | 12/2012 | Zhang ................. H04L 12/5692 370/241 |
| 2007/0294506 | A1 * | 12/2007 | Ross ............................ 711/216 |

OTHER PUBLICATIONS

Gupta et al. "Understanding and Exploiting Network Traffic Redundancy", Mar. 2007, University of Wisconsin-Madison CS Department, Technical Report #1592, Sections I-VI.*

* cited by examiner

*Primary Examiner* — Steve Young
(74) *Attorney, Agent, or Firm* — Boyle Fredrickson, S.C.

(57) ABSTRACT

A network employing multiple redundancy-aware routers that can eliminate the transmission of redundant data is greatly improved by steering redundant data preferentially into common data paths possibly contrary to other routing paradigms. By collecting redundant data in certain pathways, the effectiveness of the redundancy-aware routers is substantially increased.

7 Claims, 4 Drawing Sheets

NETWORK ROUTING SYSTEM PROVIDING INCREASED NETWORK BANDWIDTH

CROSS REFERENCE TO RELATED APPLICATIONS

This application is a continuation-in-part of U.S. patent application Ser. No. 12/418,396 filed Apr. 3, 2009, and entitled "Network Routing System Providing Increased Network Bandwidth," hereby incorporated by reference.

STATEMENT REGARDING FEDERALLY SPONSORED RESEARCH OR DEVELOPMENT

This invention was made with United States government support awarded by the following agencies: NSF 0626889 and 0746531. The United States government has certain rights in this invention.

BACKGROUND OF THE INVENTION

The present invention relates to computer networks and in particular to a routing system increasing effective network bandwidth.

Computer networks provide for the exchange of digital data among computers over a variety of media including electrical cable, optical fiber, and radio links. Commonly, the data is broken into data packets each provided with a header indicating a destination for the packet and a packet sequence number. The packets are forwarded over a complex and changing network topology through the agency of "routers" which read the packet headers and forward the packets on particular links to other routers according to a router table. At the destination, the packets are reassembled.

The term "router" as used herein will refer broadly to any network node processing data packets for the purpose of communicating them through a network and may include hubs, switches, and bridges as well as conventional routers.

The bandwidth of a network is a general measure of the rate of data transfer that can be obtained. Limits on bandwidth can include physical limitations in the media of the links between nodes, for example, caused by the impendence of electrical conductors, as well as processing limitations of the node hardware. While bandwidth limitations can generally be addressed by over-provisioning the network (e.g. adding additional links and faster hardware) these measures can be costly. Increased demand for high bandwidth content (e.g. video) and the importance of accommodating highly variable network traffic, for example "flash crowds", makes it desirable to find ways to increase the bandwidth efficiency of existing networks.

The effective bandwidth of the network may be effectively increased by a number of software techniques. "Traffic engineering" may be used to allocate the routing of data to spread the load evenly across network links. This technique, by eliminating congestion, improves the effective bandwidth of the network. Traffic engineering can be limited, however, by the difficulty of anticipating rapid variation in traffic volumes and coordinating spatially separate routers.

Data compression can also be used to increase the effective bandwidth of the network. Thus, for example, video can be compressed using an MPEG compression system to significantly decrease the amount of data required to support a video transmission. Some compression can be accomplished in this manner by the network operator trapping and converting files.

Application layer caching can also be used to improve the effective bandwidth of a network by taking commonly used network data and placing it in proxy caches at various locations on the network. The proxy caches limit the need to transmit the data over the network when it is subject to separated requests.

Improved network capacity can also be provided by monitoring and removing packet-level redundancy, for example, at network routers. Such systems will be termed "redundancy-aware routers" and generally operate independently of the application layer by inspecting packets for redundancy, removing the redundant strings from the packets, and allowing the removed material to be replaced at the destination from a downstream cache.

SUMMARY OF THE INVENTION

The present inventors have recognized that bandwidth efficiency of the network can be greatly boosted by a combination of redundancy-aware routers and a routing system that controls the paths of packets to preferentially steer redundant packets along common paths. By concentrating redundant packets in a single path, the effectiveness of packet redundancy removal is substantially boosted. The routing system makes use of the information about redundancy of packets also used by the redundancy-aware router and thus can be implemented on a local router basis. Alternatively, the routing decisions may be global providing a more comprehensive steering of redundant packets.

In this regard, the present inventors have developed a practical method for implementing the necessary routing decisions. Experiments using real-world Internet traffic have shown that data reductions of 16 to 50% can be obtained. These results are described further in *Packet Caches on Routers: the Implication of Universal Redundant Traffic Elimination* by Anand et al, SIGCOMM '08, Aug. 17-20, 2008, Seattle, Wash., USA ACM 978-1-60558-175-0/08/08 hereby incorporated by reference.

Specifically then, the present invention provides a network router for use in a network between different routers. The network router identifies data-redundancy in packets received by the router with respect to a destination of the packets and uses this knowledge of the redundancy of the packets to select a routing path through the network so that a given packet is concentrated on a routing path with other packets having corresponding redundant data.

It is thus a feature of a least one embodiment of the invention to leverage the capabilities of redundancy-aware routers to substantially increase network capacity.

The router may modify packets to be transmitted on the network when the packets have redundant data by removing the redundant data and inserting an identification of the redundant data in a previously transmitted packet. Conversely, the router may modify packets received on the network, identifying redundant data of a previously received packet by inserting redundant data from the previously received packet.

It is thus an object of invention to combine the routing system of the present invention with redundancy awareness.

The redundant data in packets may be identified by hashing chunks of data in the packets to produce fingerprints that may be compared with previous or subsequent packets, a matching of the fingerprint indicating data redundancy. The comparison of fingerprints is made faster by maintaining a hashtable of fingerprints. The hashtable data-structure may, in one embodiment, employ "cuckoo hashing".

It is thus a feature of a least one embodiment of the invention to provide an efficient and rapid method of identifying redundant data at the packet level.

The selection of the route through the network for a packet having redundant data may be obtained by linear programming, the linear programming configured to reduce a footprint variable over the network, the footprint variable being a function of size of an archetype redundant packet and network path latency.

It is thus a feature of a least one embodiment of the invention to provide a flexible and powerful technique of optimizing network routes for redundant content.

The selection of a routing path through the network may consider only packets within a limited subset of destination routers, the subset being less than all of the destination routers receiving packets with corresponding redundant data.

It is thus a feature of a least one embodiment of the invention to improve scaling of the linear programming problem, permitting faster execution of the linear programming and/or centralization of the route selection process for multiple routers.

Alternatively or in addition, the selection of a routing path through the network for a packet may first combine redundant content in packets with identical destinations into a virtual larger packet, and the linear programming may operate on the virtual larger packets.

It is thus a feature of a least one embodiment of the invention to provide a second simplification to improve scalability of the linear programming. Note that this second simplification operates synergistically with the first simplification which makes it easier to construct a virtual packet having the same destinations.

The network may include a single or multiple ISPs or single or multiple domains.

It is thus a feature of a least one embodiment of the invention to provide a system that can be expanded as necessary to extremely large networks.

The network router may use a local processor system fully contained at one node of the network or multiple processor systems contained at multiple nodes of the network and intercommunicating over the network.

Thus, it is a feature of a least one embodiment of the invention to permit distributed or centralized routing models.

In this latter centralized model, each interconnected device may sample redundancies of packets associated with particular destinations for a period of time and forward data from the sampling to the route manager, and a centralized device may return data indicating preferred network paths for packets according to packet destinations. In both of the distributed and centralized model, the determination of network paths may be performed episodically, for sampling interval, and those paths used predictably for a predetermined period of time.

It is thus a feature of a least one embodiment of the invention to permit the use of the present invention in a predictive capacity reflecting an underlying time granularity of redundancy in transmitted data. By using predictive data, the calculation burden may be greatly reduced either in a centralized or distributed model.

These particular objects and advantages may apply to only some embodiments falling within the claims and thus do not define the scope of the invention.

DETAILED DESCRIPTION OF THE PREFERRED EMBODIMENT

Figure 1:
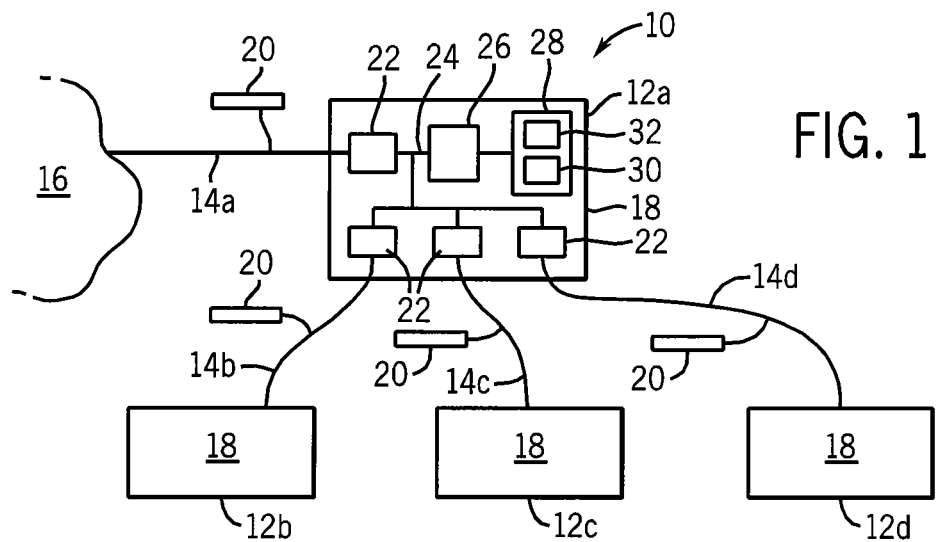
FIG. 1 is a simplified block diagram of a network-aware router suitable for use with the present invention receiving data packets and forwarding them to other routers connected in a network.

Referring now to FIG. 1, a network 10 may include a set of network vertices 12a-d interconnected by network edges 14a-d. Each of the vertices 12a-d may be a network-aware router 18 as is commonly understood in the art with the edges 14 being linking media such as electrical cable, optical link, or radio link or the like. Edge 14a in this example is an access point to the network leading typically to another network 16. In this example, the router 18 of vertex 12a may be considered a "source" vertex transmitting data packets 20 from network 16 to "destination" routers 18 of each of vertices 12b-d.

As is understood in the art, each router 18 may include network interfaces 22 providing ports associated with each of the edges 14a-d that implement an electrical interface between the communication media of the edges 14 and a common internal bus 24 of the router 18. The bus 24 may communicate with a processor 26 being, for example, a microprocessor or an application-specific integrated circuit (ASIC) or a combination of both, in turn, communicating with a memory 28. The memory 28 may hold an operating program 30 implementing the present invention, as well as data structures 32 including, for example, a routing table and other data tables as will be described below.

Figure 2:
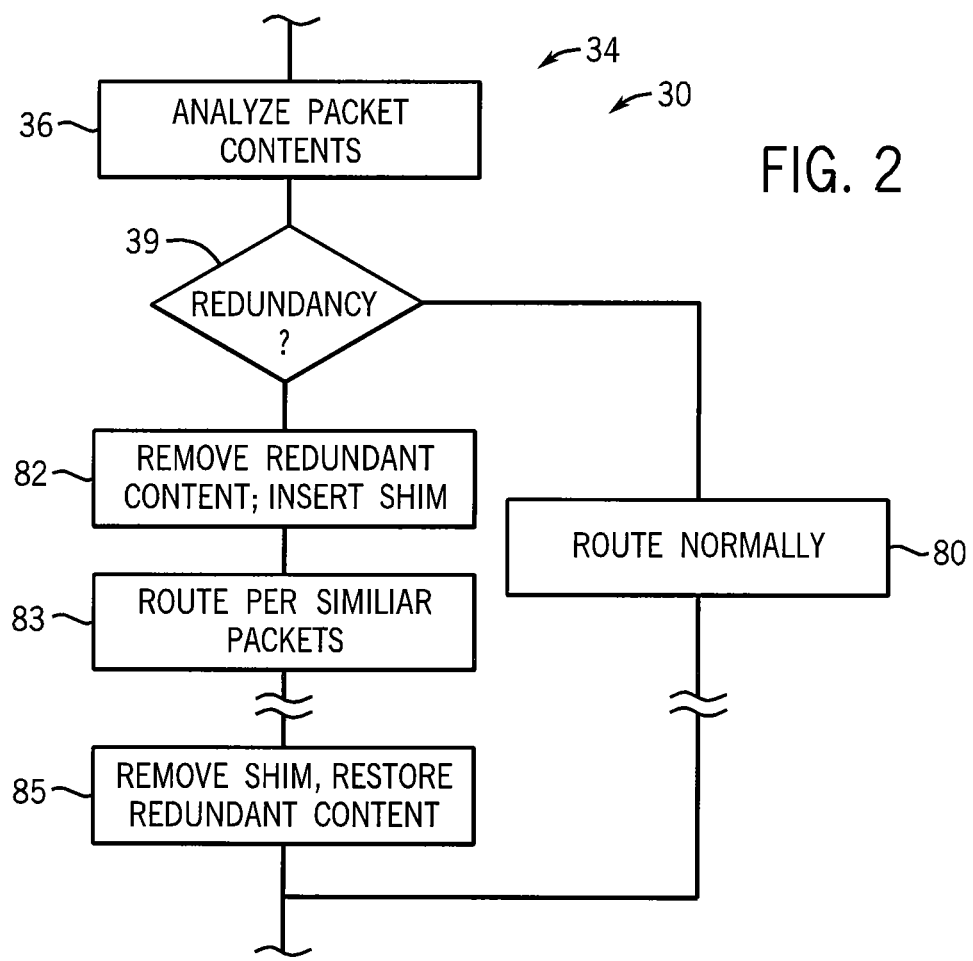
FIG. 2 is a flow chart of a program implemented by the network-aware routers of FIG. 1.
Figure 3:
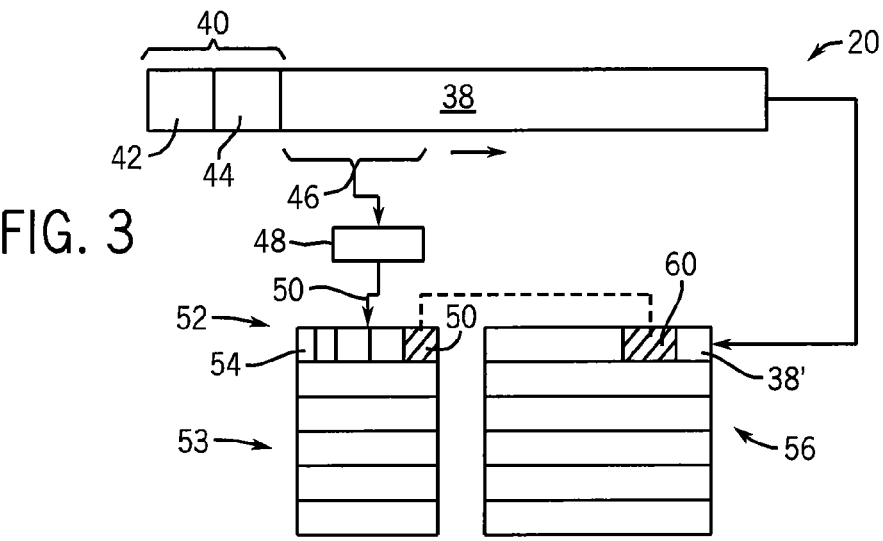
FIG. 3 is a graphical representation of the analysis of a packet for redundancy per the present invention.

Referring now to FIG. 2, the program 34 of the present invention, as indicated by process block 36, upon receipt of a data packet 20, analyzes the data packet 20 for packet level redundancy with preceding data packets. Referring also to FIG. 3, the data packet 20 will typically include a data payload 38 being a portion generally holding the data to be communicated over the network 10. Normally, the data payload 38 is preceded by a header 40 providing data necessary for the operation of the protocol of the network 10 and including, for example, a destination address 42 indicating the ultimate destination of the packet 20 and a packet serial number 44 allowing the data packet 20 to be assembled with other data packets 20 to complete a message.

At process block 36, a fingerprint of the payload 38 is developed by applying a sliding window 46 to the payload 38 and applying a hash function 48 to data within this window to produce a series of Rabin fingerprints 50. Preferably, the fingerprints are maintained in cuckoo hash which provides a constant worst-case down time necessary to do a lookup and has less memory overhead compared to traditional hash-tables. The data window may, for example, be 64 bytes, resulting in the production of S-64 fingerprints for a payload 38 of length S bytes. Predetermined ones of these fingerprints 50 (depending on the degree of data reduction desired) are selected for each packet 20 to form a representative fingerprint 52 for storage in a fingerprint table 53. While the representative fingerprints 52 are shown collected in a row (depicting their logical connection to the packets), they are in fact distributed in a hash table at hash "buckets" whose addresses are equal to the hash values of the windowed payload 38.

If the fingerprints 52 already exist in the fingerprint table 53 (any individual fingerprint 50), indicating that the data payload 38 is redundant with a previous data packet 20, the generated fingerprints are discarded and a data packet 20 is processed as a redundant data packet 20' per process blocks 82 and 83 of FIG. 2 as will be described in more detail below.

If the fingerprints 52 do not exist in the fingerprint table 53, indicating that the data payload 38 is an archetype payload 38' (unique within the experience contained in the fingerprint table 53), then the windowed data of the archetype payload 38' associated with the matching fingerprint 52 is stored in a payload table 56, and a pointer to the archetype payload 38 in the payload table 56, together with an offset pointer to the matching windowed data of the archetype payload 38', are stored in the hash bucket. The data packet 20 is then processed for normal transmission per process block 80 of FIG. 2 as will be described in more detail below.

Each hash bucket of fingerprint table 53 for an enrolled fingerprint 52 also holds a sequential index value 54 incremented for each new fingerprint 52 and archetype payload 38'. This index value 54 is used to implement a circular buffer, for example, several gigabytes in size. As the index value 54 is incremented, a "last valid index value" equal to the current index value 54 plus the size of the circular buffer is created. Valid fingerprints 52 may thus be quickly determined by comparing the index value in the hash bucket to the last valid index value. If that index value is greater than the last valid index value, the fingerprint 52 is invalid. This process eliminates the need to erase fingerprints 52 from the fingerprint table 53 allowing new fingerprint values to be simply written over invalid fingerprint values at considerable time savings.

Figure 4:
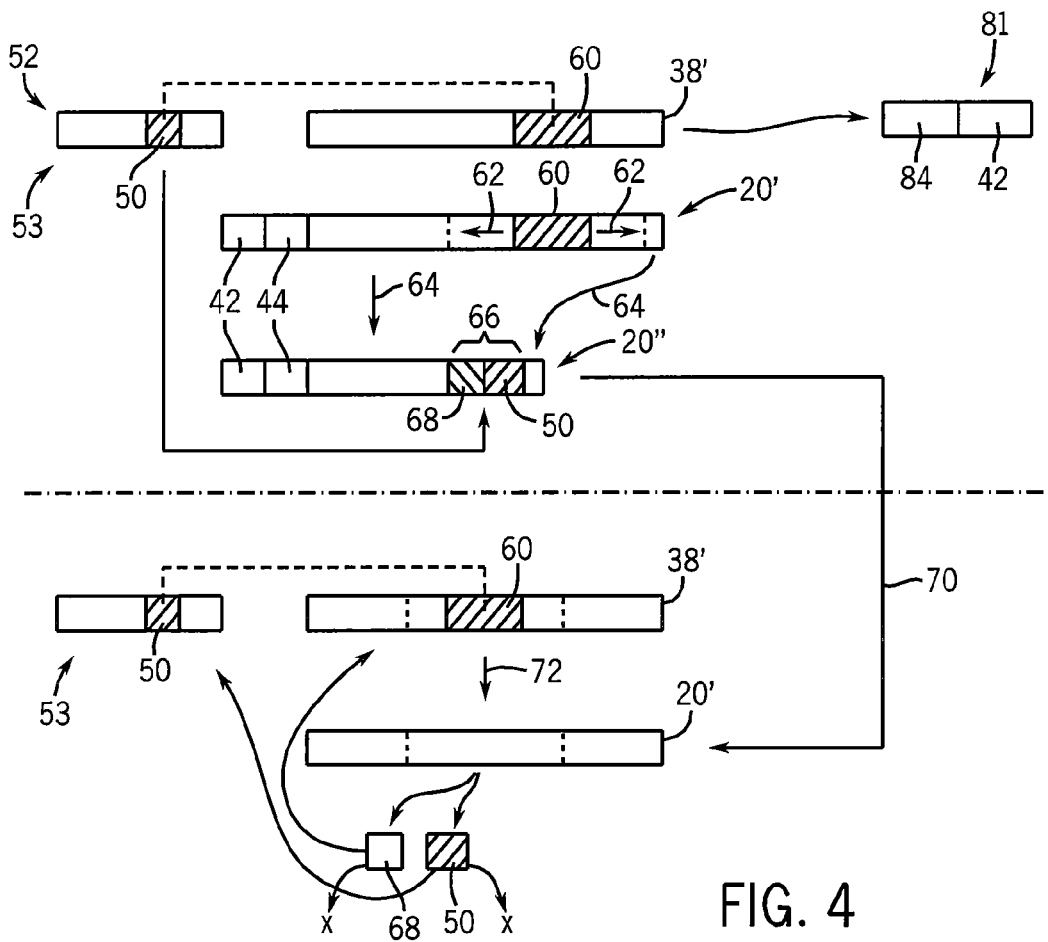
FIG. 4 is a figure similar to that of FIG. 3 showing processing of the packet to remove and restore redundant information at a transmitting and receiving router.

Referring now to FIGS. 4 and 2, a process of enrolling a payload 38 into the fingerprint table 53 and payload table 56 effectively determines whether the payload 38 of the packet 20 is redundant per decision block 39 of FIG. 2. At this time, the present invention also assesses of the degree of redundancy ($cpy_{i,j}$).

Referring now to FIG. 4, redundant data packets 20 are specially processed to remove the redundant data before transmission. In this process the valid fingerprint(s) 50 previously discovered in the fingerprint table 53 are used to identify the portion 60 of the redundant packet 20' matching the windowed data of the archetype payload 38 associated with the matching fingerprints 50. An expanding comparison of the redundant data packet 20 and the archetype payload 38' is performed to "grow" the portions 60 in each of the archetype payload 38' and the payload of new packet 20', as indicated by arrows 62, to determine the full extent of the matching on either side of the portion identified by the fingerprint.

The amount of matching ($cpy_{i,j}$) is saved as a redundancy index value 81 holding, for example, a number of matching bits 84, the index value 54 (i) and a destination address 42 (j) to be used as described further below.

When the full extent of the matching between the archetype payload 38' and the redundant data packet 20' has been determined, the unmatched portions 64 of the packet 20' are spliced around a shim 66 providing the value of the fingerprint 50 (hash address) and a byte range 68 corresponding to the amount that the packet was grown per arrows 62. The shortened packet 20" is then transmitted as indicated by arrows 70 to a receiving router.

As indicated by process block 85 of FIG. 2, at the receiving router 18, the shim 66 and fingerprint 50 are removed and the fingerprint 50 used to identify the corresponding fingerprint 50 in the fingerprint table 53 of the receiving router 18. This corresponding fingerprint 50 is in turn used to identify a stored archetype payload 38' providing a missing section 72 defined by the fingerprint and the byte range 68. Thus, the full payload 38 for the redundant data packet 20' may be reconstituted at the receiving end.

Figure 5:
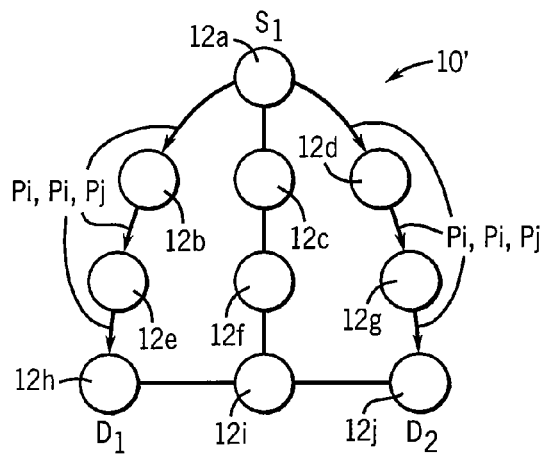
FIG. 5 is a simplified network diagram showing a prior art routing of packets in a simplified example network.

Referring now to FIG. 5, the operation of a redundancy-aware router may be illustrated by an example network 10' having a source vertex 12a ($S_1$) and in turn connected via three separate edges with three first level vertices 12b-d. Each of these vertices 12b-d is connected via single separate edges to corresponding third level vertices 12e-g, each of the latter of which connects via separate single edges to destination vertices 12h-j. Vertices 12h will be denoted destination $D_1$ and vertices 12j will be to designated destination $D_2$. Vertex 12i also includes edges to each of destinations $D_1$ and $D_2$.

Assume now that the source vertex 12a needs to transmit packets $P_i$, $P_i$, and $P_j$, to both of destinations $D_1$ and $D_2$ where packets $P_i$ provide 100% redundant data with each other and packet $P_j$ provides unique or non-redundant data. In the typical routing situation of FIG. 5, normal traffic engineering may route these packets to their respective destinations by the shortest path, thus through vertices 12b and 12e to destination $D_1$ and through vertices 12d and 12g to destination $D_2$. This path, assuming similar latencies and bandwidths for each of the edges, provides the shortest number of hops and therefore the most efficient and fastest communication path.

Figure 6:
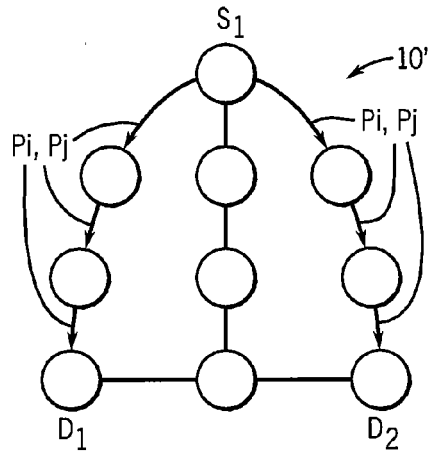
FIG. 6 is a figure similar to that of FIG. 7 showing the routing of packets using prior art redundancy-aware routers.

Referring now to FIG. 6, a redundancy aware router system described communicating the same packets on the same network 10' recognizes the redundancy of packets $P_i$ and therefore suppresses one packet $P_i$ to transmit only one packet $P_i$ and packet $P_j$ by the same path as shown in FIG. 5.

Figure 7:
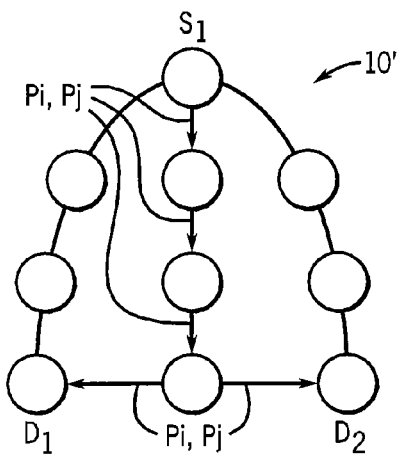
FIG. 7 is a figure similar to that of FIGS. 5 and 6 showing the use of redundancy-aware routers combined with redundancy-aware routing of the present invention.

Referring now to FIG. 7, the present invention operates to concentrate the packet transmissions to a given destination $D_1$ or $D_2$ on a common path to leverage the redundancy-aware routers such that only two packets (packets $P_i$ and $P_j$) are transmitted from vertices 12a to 12c, 12f and 12i. At vertices 12i, the packets $P_i$ and $P_j$ are duplicated to be transmitted separately through different edges to destinations $D_1$ and $D_2$.

Assuming, for the moment, that the capacities and latencies of each of the edges is the same, it will be seen that the present invention makes more efficient use of network resources. Network usage may be quantified by a footprint value of a transmission where the footprint value is the sum of the latency of each edge traversed times the total packet length that needs to be transmitted. If, in this example, all the edges have the same latency and that packets $P_i$ and $P_j$ are the same length ($P_i$), it will be seen that the footprint of the present invention per FIG. 7 is $10P_i$ while the latency of FIG. 5 is $18P_i$ and the latency of FIG. 6 is $12P_i$ This concept of footprint may be used to identify the ideal routing for packets based on knowledge of their redundancy, a knowledge which can be readily extracted from information used to create redundancy-aware routers.

Figure 8:
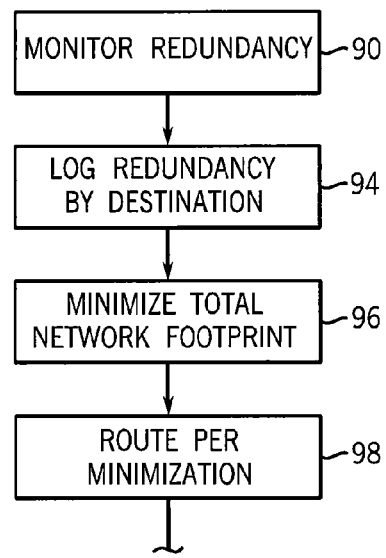
FIG. 8 is a flow chart providing the additional program steps added to a redundancy-aware router to implement the present invention.
Figure 9:
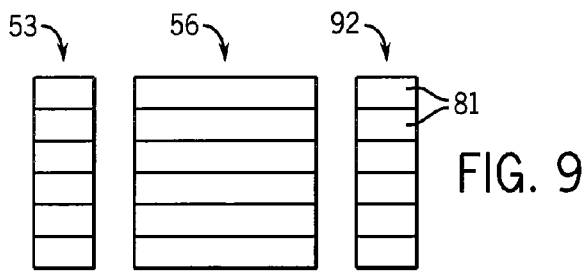
FIG. 9 is a figure similar to that of FIG. 3 showing the modification of the data structure of the redundancy of aware router to include a redundancy profile used by an embodiment of the present invention.

Referring now to FIGS. 8 and 9 the present invention supplements the redundancy-aware router as previously described by determining redundancy per process block 90 and generating a redundancy index value 81 $cpy_{i,j}$ per process block 94. This redundancy index value 81 may be used to create a redundancy profile 92 that supplements the fingerprint table 53 and payload table 56 described above holding the redundancy values 81 linked to a particular redundant payload. By having these redundancy index values, the ideal route for a given packet may be determined by analyzing the footprint for all edges of the network along all possible routing paths and selecting the routing path which minimizes that footprint as indicated by process block 96. This routing information may then be used to route the packet as indicated by process block 98.

One method of quickly assessing the ideal routing path using this criterion is linear programming in which the following objective function is minimized:

$$\sum_e \sum_i F(P_{i,e}) \quad (1)$$

where e are edges between a source vertex (S) and a destination vertex (D), i is an index of distinct packets $P_i$, and $F(P_{i,e})$ is the footprint for a unique packet $P_i$ on an edge e between vertices 12 defined as follows:

$$F(P_{i,e}) = lat_e \times |P_i| \quad (2)$$

in which $lat_e$ is the latency of a given edge, for example the delay in connecting media, and $|P_i|$ is the size of a "distinct" packet, meaning a packet that is an archetype, possibly redundant with other packets.

The linear programming operates under the following constraints:

$$\forall j, F(P_{i,e}) \geq lat_e \times cpy_{i,j} \times rte_{j,e} \times |P_i| \quad (3)$$

where $rte_{j,e}$ is a variable that defines the portion of traffic to destination j that passes along edge e which defines the routing of packets and is computed by the linear programming. The variable $rte_{j,e}$ is a value between zero and one and may be fractional permitting fractional routing.

The following additional constraints are observed:

$$\forall e, F(P_{i,e}) \leq lat_e \times |P_i| \quad (4)$$

$$\forall j, \sum_{e \in \delta^-(v)} rte_{j,e} = \sum_{e \in \delta^+(v)} rte_{j,e} \quad (5)$$

where $e \in \delta^+(v)$ is the flow into a vertex and $e \in \delta^-(v)$ is the flow out of a given vertex v.

For the source and destination vertices S and D, the following conservation constraints apply $$\forall j, \sum_{e \in \delta^-(S)} rte_{j,e} - \sum_{e \in \delta^+(S)} rte_{j,e} = 1 \quad (6)$$

$$\forall j, \sum_{e \in \delta^+(D)} rte_{j,e} - \sum_{e \in \delta^-(D)} rte_{j,e} = 1 \quad (7)$$

Finally, the capacity of each edge cannot be exceeded expressed as follows:

$$\forall e, \frac{1}{lat_e} \sum_n F(P_{n,e}) \leq Cap_e \quad (8)$$

where $Cap_e$ is derived from the edges transmission capabilities.

The linear programming described above can be ideally performed for each time interval, during when the redundancy profile more or less remains same. But this may not be known in advance and small time intervals would lead to frequent route computations, so as a practical matter routing paths may be determined for particular destinations based on historical data collected on a periodic basis, and can be triggered to re-compute the routing paths if a significant change in redundancy profile is observed Thus, for example, having determined that it is best to send packets for a particular destination upon a certain route, this route information may be enrolled with the data of the packets or provided to the routers so that all packets to that destination are routed in the same manner for given period of time. This routing will not be perfect because it will at some times be based on stale redundancy profiles 92, but this approach may represent a practical trade-off between computation burden and network efficiency.

Figure 10:
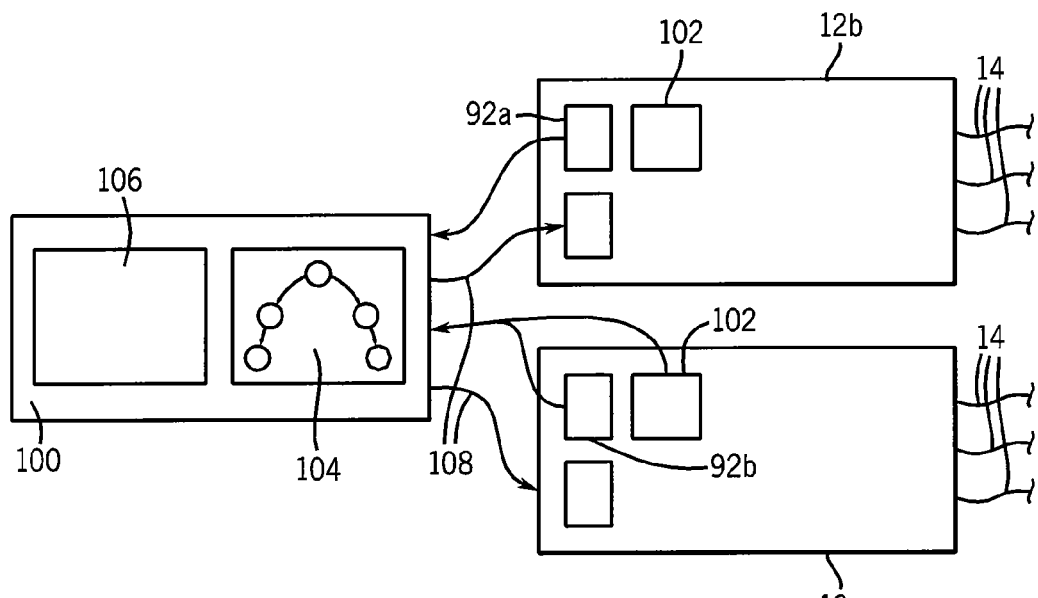
FIG. 10 is a figure similar to that of FIG. 1 showing centralization of the routing problem to remove processing burden from the hardware at each network node.

Referring now to FIG. 10, the possibility of routing using historical data allows given routers 18 at vertices 12a and 12b, for example, to collect redundancy information in redundancy profiles 92a and 92b respectively and forward that data on a periodic basis to a central route manager 100. The route manager 100 may also collect router table information 102 from each of the routers 18 of vertices 12a and 12b to create a system map 104 or may be pre-programmed with that network topology. The route manager 100 may then perform the linear programming of process block 96 of FIG. 8 using an internal processor system 106 optimized for that purpose or having greater capacity than the individual routers. The route manager 100 then returns routing information 108 to the particular routers 18 at vertices 12a and 12b on a periodic basis. In this way, the hardware of the routers may be simplified and specialized hardware may address the task of optimal routing. By centralizing the routing problem, other traffic engineering considerations requiring a global scope may be readily combined it with the present invention.

In order to improve the scalability of the linear programming of process block 96 of FIG. 8, the linear programming problem may be constrained by only considering redundancy between two different destinations for any given packet and by combining redundant content in packets for a single set of destinations into a larger virtual packet that is processed in lieu of the individual packets.

Figure 11:
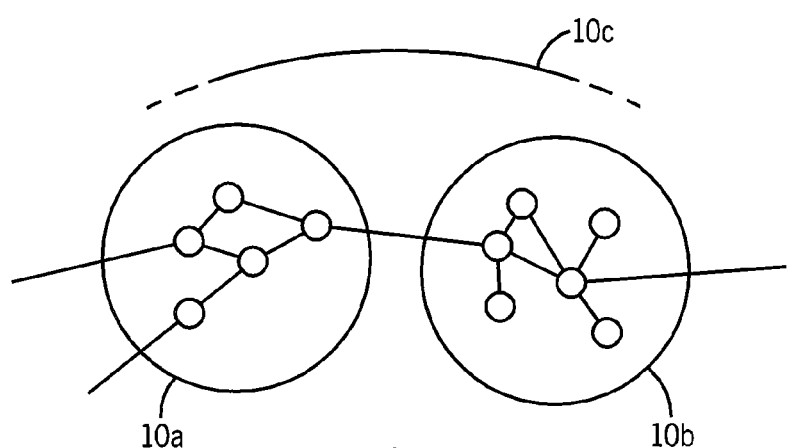
FIG. 11 is a simplified view of a multi-domain network illustrating expansion of the present invention to an arbitrary network size.

Referring now to FIG. 11, it will be understood that the present invention may be readily expanded from given networks 10a and 10b, for example representing local or campuswide networks, to larger domains simply by expanding the definition of the network and thus the present invention should not be considered limited to any particular domain or network size.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A network router for use in a network between different routers, the network router having an electronic processor executing a stored program to:
   (a) identify data-redundancy in packets:
   (b) link redundancy information about the identified data-redundancy to a destination of the packets;
   (c) transmit the redundancy information about the linked data-redundancy and destination information to a central route manager that is not a destination of the packets;
   (d) receive from the central route manager routing information that instructs the network router as to how to route the packets received by the network router in the future based on the data redundancy in the future packets, this routing information being based on a history of the linked redundancy information and destination information received from multiple other routers in the network, the routing information designating a given routing of packets having a given data redundancy and being based on historical linked redundancy information and destination information received from multiple of the other routers, the received routing information preferentially concentrating data packets with common redundant data along paths; and
   (e) route packets having the given data redundancy according to the given routing of the received routing information independent of previous routing by the network router;
   wherein the routing information designates a given routing of packets having a given data redundancy by linear programming, the linear programming configured to reduce a footprint variable over the network of the linked data redundancy and destination information received from multiple other routers, the footprint variable being a function of size of an archetype redundant packet and network path latency.

2. The network router of claim 1 wherein selection of a routing path through the network for a packet having redundant data considers only packets with corresponding redundant data also having a destination within a limited subset of destination routers, the subset being less than all of the destination routers receiving packets with corresponding redundant data.

3. The network router of claim 2 wherein selection of a routing path through the network for a packet first combines redundant content in packets going to identical set of destinations into a virtual larger packet, and wherein the linear programming operates on the virtual larger packets.

4. An electrical data transmission network comprising:
   (a) a plurality of interconnected devices, the devices executing stored programs to:
      (i) select among different network paths to communicate data packets to other devices;
      (ii) identify redundant data among packets passing through the devices to another device to suppress transmission of the redundant data in favor of data cached by the other device; and
      (iii) transmit data-redundancy information and destination information for the packets to a route manager; and
   (b) a route manager that is not a destination of the data packets communicating with the interconnected devices receiving the linked data-redundancy information and destination information from multiple other interconnected devices and executing a stored program to instruct the multiple other interconnected devices with respect to which network paths to use for data packets, the route manager forwarding routing information to the multiple other interconnected devices that instructs the other interconnected devices as to how to route packets received by the other interconnected devices in the future, based on the redundant data in the packets, the routing information concentrating packets having common redundant data on network paths based on data received by the route manager from multiple of the other interconnected devices;
   wherein each given device further execute the stored programs to route packets having given data redundancy according to the routing information from the routing manager independent of previous routing by the given device;
   wherein each interconnected device samples redundancies of packets associated with particular destinations for a period of time and forwards data from the sampling to the route manager and wherein the route manager returns data indicating preferred network paths for packets according to packet destinations; and
   wherein selection of the preferred network path for a packet having redundant data is obtained by linear programming to reduce a footprint variable being a function of archetype packet size and network path latency.

5. The electrical data transmission network of claim 4 wherein selection of a routing path through the network for a packet, first collects the packet into a virtual larger packet having multiple packets with identical destinations, and wherein the linear programming operates on the virtual larger packets.

6. The electrical data transmission network of claim 4 wherein selection of a routing path through the network for a packet having redundant data considers only packets with corresponding redundant data having a destination within a limited subset of destination routers less than all of the destination routers receiving packets with corresponding redundant data.

7. The electrical data transmission network of claim 6 wherein selection of a routing path through the network for a packet first collects the packet into a virtual larger packet having multiple packets with identical destinations, and wherein the linear programming operates on the virtual larger packets.

* * * * *